United States Patent

Hayes

[15] 3,700,742
[45] Oct. 24, 1972

[54] AROMATIC HYDROGENATION PROCESS

[72] Inventor: John C. Hayes, Palatine, Ill.

[73] Assignee: Universal Oil Products Company, Des Plaines, Ill.

[22] Filed: April 26, 1971

[21] Appl. No.: 137,615

Related U.S. Application Data

[60] Division of Ser. No. 855,725, Sept. 5, 1969, Pat. No. 3,617,510, which is a continuation-in-part of Ser. No. 839,086, July 3, 1969, abandoned.

[52] U.S. Cl.................260/667 R, 208/111, 208/143
[51] Int. Cl..................................................C07c 5/10
[58] Field of Search.......................260/667; 208/111

[56] References Cited

UNITED STATES PATENTS

| 3,617,510 | 11/1971 | Hayes | 208/111 |
| 3,607,727 | 9/1971 | Hayes | 260/667 |
| 2,906,700 | 9/1959 | Stine et al. | 208/138 |
| 2,906,701 | 9/1959 | Stine et al. | 208/138 |

*Primary Examiner*—Delbert E. Gantz
*Assistant Examiner*—J. Nelson
*Attorney*—James R. Hoatson, Jr. and Robert W. Erickson

[57] ABSTRACT

A process for hydrogenating hydrocarbons and mixtures of hydrocarbons utilizing a catalytic composite of a porous carrier material, a rhenium component, a germanium component and a Group VIII noble metal component. A specific example of one such process involves the hydrogenation of benzene to produce cyclohexane.

8 Claims, No Drawings

AROMATIC HYDROGENATION PROCESS

RELATED APPLICATIONS

The present application is a division of my copending application, Ser. No. 855,725, filed Sept. 5, 1969 now U.S. Pat. No. 3,617,510, which, in turn, is a continuation-in-part of my copending application, Ser. No. 839,086, filed July 3, 1969, all the teachings of which copending applications are incorporated herein by specific reference thereto. This application is filed to comply with a requirement for restriction in Ser. No. 855,725.

APPLICABILITY OF INVENTION

The present invention encompasses the use of a catalytic composite of a porous carrier material, a rhenium component, a germanium component and a Group VIII noble metal component in the hydroprocessing of hydrocarbons and various mixtures of hydrocarbons, and involves the conversion of hydrocarbons at such operating conditions as will effect a chemical consumption of hydrogen. Processes intended to be encompassed by the term "hydroprocessing" include hydrocracking, ring-opening, hydrorefining (for nitrogen removal and olefin saturation), desulfurization (often included in hydrorefining), hydrogenation, etc. Specifically, the invention described herein is directed toward the hydrogenation of aromatic hydrocarbons for the production of cycloparaffinic hydrocarbons.

The present invention involves the use of a catalytic composite having exceptional activity and resistance to deactivation in a hydrogenation process. The use of a particular dual-function catalytic composite enables substantial improvements in those hydrogenation processes that have traditionally used a dual-function catalyst. The catalytic composite comprises a porous carrier material, a rhenium component, a germanium component and a Group VIII noble metal component. Dual-function catalytic composites are used to promote a wide variety of hydrocarbon conversion reactions including hydrocracking, isomerization, dehydrogenation, hydrogenation, desulfurization, ring-opening, catalytic reforming, cyclization, aromatization, alkylation, polymerization, cracking, etc., some of which reactions are hydrogen-producing while others are hydrogen-consuming. It is to one of the latter group of reactions, hydrogen-consuming, that the present invention is primarily applicable.

Regardless of the reaction involved, or the particular process, it is important for the catalyst to exhibit the capability (1) to perform its specified functions initially, and (2) to perform them satisfactorily for a prolonged period of time. The analytical terms employed in petroleum refining art to measure how efficient a particular catalyst performs its intended functions, in a given hydrocarbon conversion process to produce the particular desired results, are activity, selectivity and stability. With respect to a process for the hydrogenation of an aromatic hydrocarbon, for example benzene, "activity" generally connotes the quantity of benzene which is converted. "Selectivity" refers to the quantity of converted charge stock which results in cyclohexane. "Stability" connotes the rate of change of activity and selectivity.

It is well known to those skilled in the art, and generally conceded, that the principal cause of deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the operating conditions are such that the formation of high molecular weight, black, solid or semi-solid, hydrogen-poor carbonaceous material is effected. This coats the surface of the catalyst and reduces its activity by shielding the active sites from the reactants. It is axiomatic that the performance characteristics of dual-function catalysts are very sensitive to the presence of carbonaceous deposits on the surface thereof. One who is cognizant of petroleum refining processes and techniques, will recognize that a dual-function catalyst having superior characteristics of activity, selectivity and stability generally contains a Group VIII noble metal component. This type of catalyst has been widely used in processes such as hydroisomerization, dehydrogenation, dehydrocyclization, hydrocracking, catalytic reforming, and the like. This catalyst has achieved a dominant position in the art despite the fact that its principal ingredient, a noble metal, is extremely expensive, in relatively short supply and has demonstrated a history of ever-increasing cost. The economic picture, with respect to Group VIII noble metal-containing catalysts, has served as a powerful incentive for continuous, far-reaching investigations directed at finding acceptable catalytic composites having improved processing characteristics, particularly respecting activity, selectivity and stability. One such catalytic composite, prominently described in the literature, results from the addition of a rhenium component to the noble metal component. Significantly, extensive investigations have indicated that a catalyst of rhenium alone possess a degree of activity and stability which is considerably less than the conventional noble metal catalyst. As a result of my investigations, I have now found a dual-function catalyst which affords added improvement over the rhenium-noble metal catalyst.

In particular, I have found that the use of catalytic composites of a germanium component, a rhenium component and a Group VIII noble metal component, with a porous carrier material improves the overall operation of a process for the hydrogenation of aromatic hydrocarbons. As indicated, the present invention essentially involves the use of a catalyst in which a germanium component has been added to a rhenium-noble metal, dual-function conversion catalyst whereby the performance characteristics of an aromatic hydrogenation process are sharply and materially improved.

OBJECTS AND EMBODIMENTS

An object of the present invention is to afford a process for hydrotreating a hydrocarbon, or mixtures of hydrocarbons. A corollary objective is to improve the stability, and selectivity of an aromatic hydrogenation process utilizing a highly active, germanium component-containing catalytic composite.

Therefore, in one embodiment, the present invention relates to a process for producing a cycloparaffinic hydrocarbon which comprises reacting an aromatic hydrocarbon with hydrogen and in contact with a catalytic composite of a rhenium component, a germanium component, a Group VIII noble metal component, an alkalinous metal component and a porous carrier material.

In another embodiment, the hydrogenation conditions include a pressure from 500 to about 2,000 psig., a liquid hourly space velocity of from 1.0 to about 10.0 and a maximum catalyst temperature of from 200° F. to about 800° F.

Another embodiment affords a process for producing a cycloparaffinic hydrocarbon which comprises reacting hydrogen and an aromatic hydrocarbon in a reaction zone, in contact with a non-acidic catalytic composite containing 0.01 to about 2.0 percent by weight of a rhenium component, from about 0.01 percent to about 5.0 percent by weight of a germanium component, from about 0.01 percent to about 1.5 percent by weight of an alkalinous metal component and from 0.01 percent to about 2.0 percent by weight of a Group VIII noble metal component, calculated as the elements, separating the resulting reaction zone effluent to provide a hydrogen-rich vaporous phase and to recover said cycloparaffinic hydrocarbon.

Other objects and embodiments of my invention relate to additional details regarding preferred catalytic ingredients, the concentration of components in the catalytic composite, methods of catalyst preparation, preferred processing techniques and similar particulars which are hereinafter given in the following more detailed summary of my invention.

SUMMARY OF INVENTION

As hereinabove set forth, the present invention concerns the hydroprocessing of hydrocarbons and mixtures of hydrocarbons, utilizing a particular catalytic composite. This catalyst comprises a porous carrier material having combined therewith a rhenium component, a germanium component and a Group VIII noble metal component; in many applications, the catalytic composite will also contain a halogen component, and, in some select applications, an alkali metal or alkaline-earth metal component. Considering first the porous carrier material, it is preferred that it be an absorptive, high-surface area support having a surface area of about 25 to about 500 square meters per gram. In particular, suitable carrier materials are selected from the group of amorphous refractory inorganic oxides including alumina, titania, zirconia, chromia, magnesia, thoria, boria, silica-alumina, silica-magnesia, chromia-alumina, alumina-boria, alumina-silicaboron phosphate, silica-zirconia, etc. When of the amorphous refractory inorganic oxide type, a preferred carrier material constitutes substantially non-acidic alumina.

As hereinabove set forth, the porous carrier material, for use in the process of the present invention, is a refractory inorganic oxide, and may be either alumina in and of itself, or alumina in combination with one or more other refractory inorganic oxides. When utilized as the sole component of the carrier material, the alumina may be of the gamma-, eta-, or theta-alumina type, with gamma- or eta-alumina giving the better results. In addition, preferred carrier materials have an apparent bulk density of about 0.30 to about 0.70 grams per cc. and surface area characteristics indicating an average pore diameter of about 20 to about 300 Angstroms, a pore volume of about 0.10 to about 1.0 milliliters per gram and a surface area of about 100 to about 500 square meters per gram. It is understood that specific methods of preparing the carrier material are not essential to the present invention. For example an alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination, is converted to alumina. The carrier material may be formed in any desired shape such as spheres, pills, cakes, extrudates, powders, granules, etc., and may further be utilized in any desired size.

An essential constituent of the catalytic composite used in the present invention is a germanium component, and it is a preferred, but not restrictive feature of the catalyst, that the germanium component be present in an oxidation state above that of the elemental metal. That is to say, the germanium component exists within the catalytic composite in either the +2 or +4 oxidation state, the latter being the most likely state. Accordingly, the germanium component will be present in the composite as a chemical compound, such as the oxide, sulfide, halide, etc., or as a chemical combination with the carrier material. On the basis of the evidence currently available, it is believed that the germanium component exists as germanous or germanic oxide. This germanium component may be incorporated in the catalytic composite in any suitable manner known to the art such as by co-precipitation or cogellation with the porous carrier material, ion-exchange with the gelled carrier material or impregnation with the carrier material either after or before it is dried and calcined. It is to be noted that it is intended to include within the scope of the present invention all conventional methods for incorporating a metallic component in a catalytic composite and the particular method of incorporation used is not deemed to be an essential feature of the present invention. One method of incorporating the germanium component into the catalytic composite involves co-precipitating the germanium component during the preparation of the carrier material, such as alumina or alumina-silica. This method typically involves the addition of a suitable soluble germanium compound such as germanium tetrachloride to the inorganic oxide hydrosol and then combining the hydrosol with a suitable gelling agent and dropping the resultant mixture into an oil bath maintained at elevated temperatures. The droplets remain in the oil bath until they set and form hydrogel spheres. The spheres are withdrawn from the oil bath and subjected to specific aging treatments in oil and in an ammoniacal solution. The aged spheres are washed and dried at a temperature of about 200°F. to about 400°F., and thereafter calcined at an elevated temperature of about 850°F. to about 1,300°F. Further details of spherical particle production may be found in U.S. Pat. No. 2,620,314, issued to James Hoekstra. After drying and calcining the resulting gelled carrier material, an intimate combination of alumina and germanium oxide is obtained.

A preferred method of incorporating the germanium component into the catalytic composite involves the utilization of a soluble, decomposable compound of germanium to impregnate the porous carrier material. In general, the solvent used in this impregnation step is selected on the basis of the capability to dissolve the desired germanium compound, and is preferably an aqueous, or alcoholic solution. Thus, the germanium component may be added to the carrier material by commingling the latter with a solution of a suitable germanium salt or suitable compound of germanium, such as germanium tetrachloride, germanium difluoride, germanium tetrafluoride, germanium di-iodide, germanium monosulfide, and the like compounds. A particularly preferred impregnation solution comprises nascent germanium metal dissolved in chlorine water to yield germanium monoxide. In general, the germanium component can be impregnated either prior to, simultaneously with, or after the Group VIII noble metal component is added to the carrier material. However, I have found that excellent results are obtained when the germanium component is impregnated simultaneously with the Group VIII noble metal component and the rhenium component. In fact, I have determined that a preferred impregnation solution contains chloroplatinic acid, perrhenic acid, hydrogen chloride, and germanous oxide dissolved in chloride water, especially when the catalyst is intended to contain combined chloride. Following the impregnation step, the resulting composite is dried and calcined.

Regardless of which germanium compound is used in the preferred impregnation step, it is important that the germanium component be uniformly distributed throughout the carrier material. It is preferred to use a volume ratio of impregnation solution to carrier material of at least 1.5:1 and preferably about 2:1 to about 10:1, or more, and to maintain the pH in the range of 1.0 to 7.0. Similarly, it is preferred to use a relatively long contact time during the impregnation step ranging from about one-quarter hour up to about one-half hour or more before drying to remove excess solvent in order to insure a high dispersion of the germanium component on the carrier material. The carrier material is, likewise, preferably constantly agitated during this preferred impregnation step.

As previously indicated, the catalyst for use in the process of the present invention also contains a Group VIII noble metal component. Although the process of the present invention is specifically directed to the use of a catalytic composite containing platinum, it is intended to include other Group VIII noble metals such as palladium, rhodium, ruthenium, osmium and iridium. The Group VIII noble metal component, for example platinum, may exist within the final catalytic composite as a compound such as an oxide, sulfide, halide, etc., or in an elemental state. The Group VIII noble metal component generally comprises about 0.01 to about 2.0 percent by weight of the final composite, calculated on an elemental basis. In addition to platinum, another particularly preferred Group VIII noble metal component is palladium, or a compound of palladium.

The Group VIII noble metal component may be incorporated within the catalytic composite in any suitable manner including co-precipitation or cogellation with the carrier material, ion-exchange, or impregnation. A preferred method of preparation involves the utilization of a water-soluble compound of a Group VIII noble metal component in an impregnation technique. Thus, a platinum component may be added to the carrier material by commingling the latter with an aqueous solution of chloroplatinic acid. Other water-soluble compounds of platinum may be employed, and include ammonium chloroplatinate, platinum chloride, dinitro diamino platinum, etc. In addition, it is generally preferred to impregnate the carrier material after it has been calcined in order to minimize the risk of washing away the valuable Group VIII noble metal compounds; however, in some instances it may prove advantageous to impregnate the carrier material when it exists in a gelled state.

Regardless of how the components of the catalyst are combined with the carrier material, the final composite will generally be dried at a temperature of about 200°F. to about 600°F., for a period of from 2 to about 24 hours or more, and finally calcined at a temperature of about 700° to about 1,100° F. in an atmosphere of air, for a period of about 0.5 to about 10 hours in order to convert the metallic components substantially to the oxide form.

Another essential component of the catalytic composite is a rhenium component. This component may also be present as an elemental metal, as a chemical compound such as the oxide, sulfide, halide, etc., or in a physical or chemical combination with the porous carrier material and/or other components of the catalytic composite. The rhenium component is usually utilized in an amount sufficient to result in a final catalytic composite containing about 0.01 to about 2.0 percent by weight of rhenium, calculated on an elemental basis. The rhenium may be incorporated within the catalytic composite in any suitable manner, and during any selected stage in the preparation of the catalyst. It is generally advisable to incorporate the rhenium component by way of an impregnation step after the porous carrier material has been formed in order that the expensive metal will not be lost due to washing and purification techniques applied to the carrier material during the course of its preparation. Although any suitable method for incorporating a catalytic component into a porous carrier material can be utilized to incorporate the rhenium component, the preferred procedure involves impregnation of the porous carrier material. The impregnating solution can, in general, be a solution of a suitable soluble, decomposable rhenium salt such as ammonium perrhenate, sodium perrhenate, potassium perrhenate, and the like salts. In addition, solutions of rhenium halides such as rhenium chloride, rhenium fluoride, etc., may be used, with the preferred impregnating solution being an aqueous solution of perrhenic acid. The porous carrier material can be impregnated with the rhenium component either prior to, simultaneously with, or after the other components herein mentioned have been combined therewith. Best results are ordinarily achieved when the rhenium component is impregnated simultaneously with the germanium and Group VIII noble metal.

Although not essential to successful hydroprocessing in all cases, in fact detrimental to aromatic hydrogenation, a halogen component may be incorporated into the catalytic composite. Although the precise form of the chemistry of the association of the halogen component with the carrier material and metallic components is not accurately known, it is customary in the art to refer to the halogen component as being combined with the carrier material, or with the other ingredients of the catalyst. The combined halogen may be either fluorine, chlorine, iodine, bromine, or mixtures thereof. The halogen may be added to the carrier material in any suitable manner, and either during preparation of the carrier, or before, or after the addition of the other components. For example, the halogen may be added at any stage in the preparation of the carrier material, or to the calcined carrier material, and in the form of an aqueous solution of an acid such as hydrogen fluoride, hydrogen chloride, hydrogen bromide, hydrogen iodide, etc. The halogen component or a portion thereof may be composited with the carrier material during the impregnation of the latter with either the rhenium component, the germanium component, or both. The hydrosol, which is typically utilized to form the amorphous carrier material, may contain halogen and thus contribute at least a portion of the halogen component to the final composite. The quantity of halogen is such that the final catalytic composite contains about 0.1 to about 1.5 percent by weight, calculated on the basis of the elemental halogen.

In processes where the natural acid function of the catalytic composite must necessarily be attenuated, as in aromatic hydrogenation, the metallic components will be combined with a carrier material consisting essentially of alumina. In this latter situation, a halogen component is often not combined with the catalytic composite, and the inherent acid function of the dual-function catalytically active metallic component is further attenuated through the addition of from 0.01 to about 1.5 percent by weight of an alkalinous metal component. Specifically, a benzene-concentrate is often used as the starting material for the production of cyclohexane, primarily to satisfy the demand thereof in the manufacture of nylon. In order to avoid ring-opening, which results in loss of both the benzene and the cyclohexane product, an alkalinous metal component is combined with the catalytic composite in an amount of from 0.01 to about 1.5 percent by weight. This component is selected from the group of lithium, sodium, potassium, rubidium, cesium, barium, strontium, calcium, magnesium, beryllium, mixtures of two or more, etc. In general, more advantageous results are achieved through the use of the alkali metals, particularly lithium and/or potassium.

Regarding the preferred amounts of the various metallic components of the catalyst, I have found it to be a good practice to specify the quantities of the rhenium component and the germanium component as a function of the amount of the noble metal component. On this basis, the amount of the rhenium component is ordinarily selected so the atomic ratio of rhenium to the noble metal component is about 0.1:1.0 to about 3.0:1.0. Similarly, the amount of the germanium component is ordinarily selected to produce a composite containing an atomic ratio of germanium to noble metal of about 0.25:1.0 to about 6.0:1.0.

Another significant parameter for the subject catalyst is the "total metals content" which is defined to be the sum of the noble metal component, the rhenium component, and the germanium component, calculated on an elemental germanium, rhenium and noble metal basis. Good results are ordinarily obtained with the subject catalyst when this parameter is fixed at a value of about 0.15 to about 4.0 percent by weight, with best results ordinarily achieved at a metals loading of about 0.3 to about 2.0 percent by weight.

Correlating the above discussion of each of the essential and preferred components of the catalytic composite, it is evident that a particularly preferred catalytic composite comprises a combination of a Group VIII noble metal component, a rhenium component, a germanium component, often with a halogen component, and a porous carrier material in amounts sufficient to result in the composite containing about 0.5 to about 1.5 percent by weight of halogen, about 0.05 to about 1.0 percent by weight of a noble metal component, about 0.05 to about 1.0 percent by weight of rhenium and about 0.05 to about 2.0 percent by weight of germanium. Accordingly, specific examples of especially preferred catalytic composites, containing, for example, platinum, are as follows: (1) a catalytic composite comprising a combination of 0.5 by weight of germanium, 0.5 percent by weight of rhenium and about 0.75 percent by weight of platinum; (2) a catalytic composite comprising a combination of 0.1 percent by weight of germanium, 0.1 percent by weight of rhenium and about 0.1 percent by weight of platinum; (3) a catalytic composite comprising a combination of about 0.375 percent by weight of germanium, 0.375 percent by weight of rhenium and about 0.375 percent by weight of platinum; (4) a catalytic composite comprising a combination of 0.2 percent by weight of germanium, 0.1 percent by weight of rhenium and 0.5 percent by weight of platinum; (5) a catalytic composite comprising a combination of 0.5 percent by weight of germanium, 0.25 percent by weight of platinum and about 0.25 percent by weight of rhenium; and, (6) a catalytic composite comprising a combination of 1.0 percent by weight of germanium, 0.5 percent by weight of rhenium and about 0.5 percent by weight of platinum. The amounts of the components reported in these examples are, of course, calculated on an elemental basis.

Prior to its use, in the hydroprocessing of hydrocarbons, the resultant calcined catalytic composite may be subjected to a substantially water-free reduction technique. This technique is designed to insure a more uniform and finely divided dispersion of the metallic components throughout the carrier material. Preferably, substantially pure and dry hydrogen (i.e., less than about 30.0 ppm. of water) is employed as the reducing agent. The calcined catalyst is contacted at a temperature of about 800° to about 1,200° F., and for a period of about 0.5 to about 10 hours, or more, and effective to substantially reduce the metal components. This reduction technique may be performed in situ as part of a start-up sequence provided precautions are observed to pre-dry the unit to a substantially water-free state, and if substantially water-free hydrogen is employed.

Again with respect to effecting hydrogen-consuming reactions, the process is generally improved when the reduced composite is subjected to a presulfiding operation designed to incorporate from about 0.05 to about 0.50 percent by weight of sulfur, on an elemental basis. This presulfiding treatment takes place in the presence of hydrogen and a suitable sulfur-containing compound including hydrogen sulfide, lower molecular weight mercaptans, organic sulfides, carbon disulfide, etc. This procedure involves treating the reduced catalyst with a sulfiding gas, such as a mixture of hydrogen and hydrogen sulfide, and at conditions sufficient to effect the desired incorporation of sulfur. These conditions include a temperature of from about 50°F. to about 1,100° F. It is generally considered a good practice to perform the presulfiding technique under substantially water-free conditions.

According to the present invention, the hydrocarbon charge stock and hydrogen are contacted with a catalyst of the type described above in a hydrocarbon conversion zone. The contacting may be accomplished by using the catalyst in a fixed-bed system, a moving-bed system, a fluidized-bed system, or in a batch-type operation; however, in view of the risk of attrition loss of the catalyst, it is preferred to use the fixed-bed system. Furthermore, it is well known that a fixed bed catalytic system offers many operational advantages. In this type of system, a hydrogen-rich gaseous phase and the charge stock are preheated by any suitable heating means to the desired reaction temperature, the mixture being passed into the conversion zone containing the fixed-bed of the catalytic composite. It is understood, of course, that the conversion zone may be one or more separate reactors having suitable means therebetween to insure that the desired conversion temperature is maintained at the entrance to the catalyst bed. It should also be noted that the reactants may be contacted with the catalyst bed in either upward, downward or radial flow fashion, with a downward/radial flow being preferred. Additionally, the reactants may be in the liquid phase, a mixed liquid-vapor phase or a vapor phase when they contact the catalyst.

In view of the fact that the reactions being effected are exothermic in nature, an increasing temperature gradient is experienced as the hydrogen and feed stock traverse the catalyst bed. For any given hydrogen-consuming process, it is desirable to maintain a maximum catalyst bed temperature below about 900° F., which temperature is virtually identical to that as may be conveniently measured at the outlet of the reaction zone. In order to assure that the catalyst bed temperature does not exceed the maximum allowed for a given process, the use of conventional quench streams, either normally liquid or gaseous, introduced at one or more intermediate loci of the catalyst bed, may be utilized. In some of the hydroprocesses, especially where hydrocracking a heavy hydrocarbonaceous material to produce lower-boiling hydrocarbon products, that portion of the normally liquid product effluent boiling above the end point of the desired product will be recycled to combine with such hydrocarbon charge stock. In these situations, the combined liquid feed ratio (defined as volumes of total liquid charge to the reaction zone per volume of fresh feed charge to the reaction zone) will be within the range of about 1.1 to about 6.0.

Specific operating conditions, processing techniques, particular catalytic composites and other process details will be given in the following description. These will be presented by way of an example given in conjunction with a commercially scaled operating unit.

EXAMPLE

In presenting this example, it is not intended that the present invention be limited to the specific illustration, nor is it intended that the given process be limited to the particular operating conditions, catalytic composite, processing technique, charge stock, etc. It is understood, therefore, that the present invention is merely illustrated by the specifics hereinafter set forth.

The process of the present invention is herein illustrated as being applied to the hydrogenation of aromatic hydrocarbons such as benzene, toluene, the various xylenes, naphthalenes, etc., to form the corresponding cyclic paraffins. When applied to the hydrogenation of aromatic hydrocarbons which are contaminated by sulfurous compounds, and especially thiophenic compounds, the process is advantageous in that it affords 100.0 percent conversion without the necessity for the substantially complete and prior removal of the sulfur compounds. The corresponding cyclic paraffins, resulting from the hydrogenation of the aromatic nuclei, include compounds such as cyclohexane, mono-, di-, tri-substituted cyclohexanes, decahydronaphthalene, tetra-hydronaphthalene, etc., which find widespread use in a variety of commercial industries in the manufacture of nylon and as a solvent for various fats, oils, waxes, etc.

Aromatic concentrates are obtained by a multiplicity of techniques. For example, a benzene-containing fraction may be subjected to distillation to provide a heart-cut which contains the benzene. This is then subjected to a solvent extraction process which separates the benzene from the normal or iso-paraffinic components, as well as the naphthenes contained therein. Benzene is readily removed from the selected solvent by way of distillation, and in a purity of 99.0 percent, or more. Large quantities of benzene are also available as the product stream from hydrodealkylation units.

Heretofore, the hydrogenation of aromatic hydrocarbons, for example benzene, has been effected with a nickel-containing catalyst at hydrogenation conditions. This is extremely disadvantageous in many respects, and especially from the standpoint that nickel is quite sensitive to the minor quantity of sulfurous compounds which may be contained in the benzene concentrate. In accordance with the present process, the benzene is hydrogenated in contact with a non-acidic catalytic composite containing 0.01 to about 2.0 percent by weight of a rhenium component, from about 0.01 to about 5.0 percent by weight of a germanium component, from 0.01 to about 2.0 percent by weight of a noble metal component and from about 0.01 to about 1.5 percent by weight of an alkalinous metal component. Operating conditions include a maximum catalyst bed temperature in the range of about 200° F. to about 800° F., a pressure of from 400 to about 2,000 psig., an LHSV (liquid hourly space velocity) of from about 1.0 to about 10.0 and a hydrogen concentration in an amount sufficient to yield a mole ratio of hydrogen to cyclohexane in the product effluent from the last reaction zone, but substantially less than about 4.0:1. One operating technique involves the use of three reaction zones, each one of which preferably contains approximately one-third of the total quantity of the catalyst employed. The process is further facilitated when the total fresh benzene is added in three portions, preferably but not necessarily approximately equal, one each to the inlet of each of the three reaction zones. While the benzene, therefore, passes in parallel flow through the reaction zones, the hydrogen and cyclohexane recycle pass in series flow through the reaction zones.

In this illustration, the catalyst utilized is a substantially halogen-free alumina carrier material combined with about 0.5 percent by weight of germanium, 0.375 percent by weight of rhenium, 0.375 percent by weight of platinum and about 0.80 percent by weight of lithium, all of which are calculated on the basis of the elemental metals. The hydrogenation process will be described in connection with a commercially-scaled unit having a fresh benzene feed capacity of about 5,200 Bbl./day. The benzene-rich fresh feed is the product stream from an hydrodealkylation unit operating in combination with the hydrogenation unit; thus, on a moles/hr. basis of 660.35, the total amount of benzene is 591.35 moles/hr., while the cyclohexane content is 41.58 moles/hr., the remaining 27.42 moles/hr. constituting principally pentanes and lighter hydrocarbons.

Make-up gas, rich in hydrogen, to supplant that chemically consumed in the process, lost by dissolution in the product stream and vented to provide process pressure control, is supplied in part from the hydrodealkylation unit (2,900 moles/hr.) and in part from a catalytic reforming unit (1,159.80 moles/hr.). The total quantity of hydrogen only, inclusive of that recycled internally, is 3,912.96 moles/hr. The total gaseous material is admixed with a cyclohexane-rich recycle stream in an amount of 368.06 moles/hr., of which about 310.70 is cyclohexane. The total fresh benzene feed is divided into three substantially equal portions of 220.12 moles/hr., one of which is admixed with the cyclohexane/hydrogen mixture. Following suitable heat-exchange with various hot effluent streams, the total feed to the first reaction zone is at a temperature of 350° F. and a pressure of 470 psig. The reaction zone effluent is at a temperature of 565° F. and a pressure of about 465 psig. The total effluent from the first reaction zone is utilized as a heat-exchange medium, in a steam generator, whereby the temperature is reduced to a level of about 405° F. The cooled effluent is admixed with about 220.12 moles per hour of fresh benzene concentrate, the resulting temperature being 350° F. The mixture enters the second reaction zone at a pressure of about 455 psig. The second reaction zone effluent, at a pressure of 450 psig. and a temperature of 560° F. is also utilized as a heat-exchange medium to generate steam whereby the temperature is reduced to a level of about 375° F. Upon being admixed with 220.12 moles per hour of fresh benzene concentrate, the temperature is again 350° F., and the mixture enters the third reaction zone at a pressure of about 440 psig. The third reaction zone effluent is at a temperature of about 550° F. and a pressure of about 435 psig. Again, through the utilization of the effluent as a heat-exchange medium, the temperature is reduced to a level of about 200° F., and subsequently reduced to a level of about 90° F., through the use of an air-cooled condenser. The cooled third reaction zone effluent is introduced into a high pressure separator, at a pressure of about 400 psig.

A hydrogen-rich vaporous phase is withdrawn from the high pressure separator and is recycled by way of compressive means, at a pressure of about 470 psig., to the inlet of the first reaction zone. A portion of the normally liquid phase is recycled to the first reaction zone as the cyclohexane concentrate hereinbefore described. The remainder of the normally liquid phase is passed into a stabilizing column, often referred to as a reboiled stripping column, functioning at an operating pressure of about 250 psig., a top temperature of about 160° F. and a bottom temperature of about 430° F. The cyclohexane product is withdrawn from the stabilizer as a bottoms stream, the overhead stream being vented to fuel. The cyclohexane concentrate is recovered in an amount of about 597.92 moles per hour, of which only about 0.29 moles per hour constitutes other hexanes, inclusive of methylcyclohexanes. In brief summation, of the 50,490 pounds per hour of fresh benzene feed (including all other liquid and vapor constituents) 50,340 pounds per hour of cyclohexane product is recovered.

The foregoing specification, and especially the example thereof, illustrates the process of the present invention and the benefits afforded through the utilization thereof.

I claim as my invention:

1. A process for producing a cycloparaffinic hydrocarbon which comprises contacting hydrogen and an aromatic hydrocarbon in a reaction zone, at a temperature range of between 200° to 800° F and a pressure from 500 to about 2,000 psig. with a catalytic composite of a Group VIII noble metal component, a germanium component, a rhenium component, an alkalinous metal component and a porous carrier material, and separating the resulting reaction zone effluent to recover said cycloparaffinic hydrocarbon.

2. The process of claim 1 further characterized in that said catalytic composite contains 0.01 to about 2.0 percent by weight of a Group VIII noble metal component, from about 0.01 to about 2.0 percent by weight of a rhenium component, from about 0.01 to about 5.0 percent by weight of a germanium component and from about 0.01 to about 1.5 percent by weight of an alkalinous metal component, calculated as the elements.

3. The process of claim 1 further characterized in that said aromatic hydrocarbon is benzene.

4. The process of claim 1 further characterized in that said aromatic hydrocarbon is toluene.

5. The process of claim 1 further characterized in that said aromatic hydrocarbon is a xylene.

6. The process of claim 1 further characterized in that said aromatic hydrocarbon is a naphthalene.

7. The process of claim 1 further characterized in that said alkalinous metal component is a lithium or potassium component.

8. The process of claim 1 further characterized in that said Group VIII noble metal component is a platinum or palladium component.

* * * * *